United States Patent Office 2,862,194
Patented Nov. 25, 1958

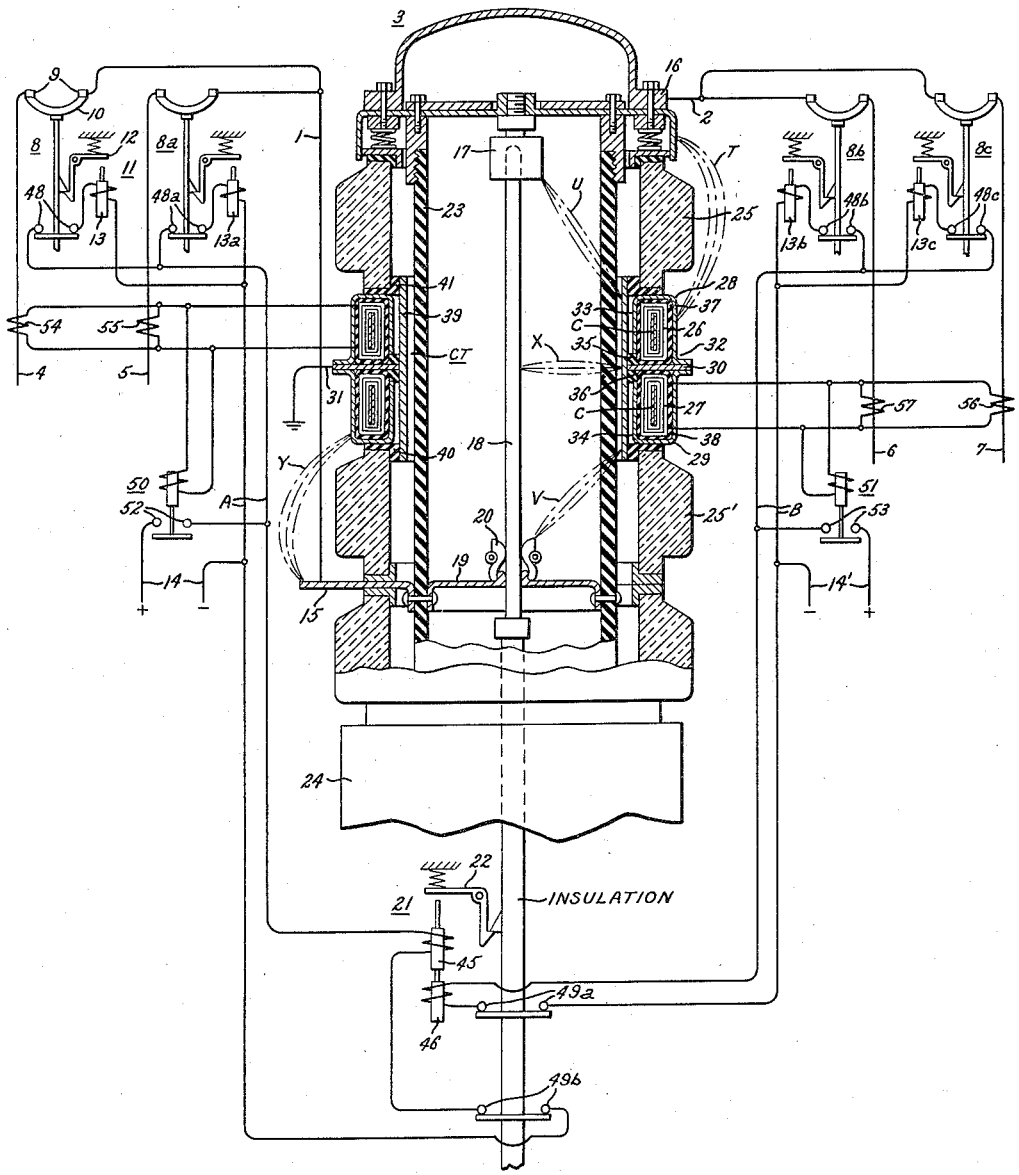
Inventors:
Thellwell R. Coggeshall,
Herman Bany,
by J. Wesley Haubner
Their Attorney.

2,862,194

ELECTRIC PROTECTIVE EQUIPMENT

Thellwell R. Coggeshall, Cynwyd, and Herman Bany, Lansdowne, Pa., assignors to General Electric Company, a corporation of New York Original application May 6, 1953, Serial No. 353,358, now Patent No. 2,804,576, dated August 27, 1957. Divided and this application November 30, 1956, Serial No. 625,350

8 Claims. (Cl. 336—173)

This application is a division of our application Serial No. 353,358, now Patent No. 2,804,576, filed May 6, 1953, and assigned to the assignee of the present invention.

The present invention relates to a current transformer construction and, more particularly, to a current transformer construction which is especially adapted for use in an overlapping differential protective system.

To facilitate an understanding of our invention, we have illustrated and described the invention as being utilized in differential protective circuits having current transformer windings which are directly connected. However, it will be apparent to those versed in the protective relaying art, that the invention is equally applicable to protective equipment in which the windings are interrelated by and desired signal transmission channel over which information may be conveyed conductively or electromagnetically to effect relay operation. Examples of such protective systems are the conventional wire-pilot and carrier-current pilot types of relaying equipment. Since all of these types of relaying equipment operate on a differential principle, they are referred to generically hereinafter as being of the differential protective type.

Some of the problems solved by our invention should become apparent from the following description of certain limitations of conventional differential protective equipment. For example, for sensing a fault in a given zone of an electric power circuit, it is conventional to mount a pair of current transformer windings at opposite ends of the zone and to connect the windings in a differential protective circuit. A relay suitably connected in such a differential circuit will operate in response to a fault occurring inside this protective zone but will remain inactive if the fault is external to this protected zone. Where it is desired to provide a pair of such protected zones in the power circuit, a pair of such differential protective circuits are used. The current transformer windings of these circuits are usually arranged in locations such that the pair of protected zones overlap, i. e., one protected zone extends into the other protected zone so as to form a zone of overlap common to both protected zones. With such an overlapping protective system, faults occurring within the zone of overlap are sensed by both differential protective circuits, whereas those in only a single protective zone are sensed only by the single differential protective circuit protecting that particular zone. Thus, such an overlapping system can distinguish between faults within the zone of overlap, and faults external thereto; and can further distinguish between those external faults occurring at one side of the overlap zone and those external faults occurring at the other side of said overlap zone.

Where it is desired to distinguish between faults occurring within a circuit breaker and those external thereto and to further distinguish between those external faults occurring at one side of the breaker and those external faults occurring at the other side of the breaker, it has been proposed heretofore to arrange a pair of current transformer windings of such an overlapping system at opposite terminals of the circuit breaker so that the zone of overlap is co-extensive with the internal circuit of the circuit breaker. Such an arrangement is exemplified by the tank-type circuit breaker having bushing-type current transformers mounted on each of its terminal bushings. In such an arrangement, substantially all faults occurring in the internal circuit of the circuit breaker will be faults in the overlap zone, which the system can distinguish from faults external to the breaker, the latter of which are faults located in only one protected zone, i. e., beyond either end of the overlap zone. Some circuit breakers, however, have no bushings, and thus do not lend themselves to the use of current transformer windings at opposite terminals, or bushings. From the standpoint of economy, it is sometimes desirable in such breakers to mount the pair of windings at points remote from the breaker terminals. In such an arrangement, the zone of overlap is not co-extensive with the internal circuit of the circuit breaker, and hence, unless certain modifications are made in the protective system, incorrect operation will take place for certain fault conditions, e. g., the occurrence of faults internal to the circuit breaker but external to the overlap zone.

It is therefore an object of this invention to provide a current transformer construction which makes it possible to mount the current transformer windings of an overlapping differential relay protective system at points remote from the terminals of a circuit breaker or the like without affecting the ability of the transformer windings to distinguish between faults in the internal circuit of the circuit breaker and those faults external to said internal circuit.

It is a further object of this invention to shield the current transformer windings in such a manner that they may be mounted in juxtaposed relationship on a housing for a circuit breaker or the like by a sturdy and inexpensive mounting and yet are adapted in this relationship to accurately distinguish between faults occurring within said housing and those external thereto.

It is still another object of this invention to construct and shield the current transformer windings in such a manner that alternate breakdown paths to ground with respect to the transformers are provided, one path favoring internal fault currents and the other path favoring external fault currents in such a manner that the current transformers may accurately distinguish between internal and external faults. The term "fault current," as used in this application, denotes that current which flows to ground from a breakdown point in the power circuit.

In carrying out our invention in one form, we provide a pair of juxtaposed current transformer windings which are adapted to be mounted on the housing of a circuit breaker or the like at points remote from the terminals of the breaker. The windings are encased by conductive shielding structure which is so constructed that fault currents external to the housing will take one breakdown path to ground with respect to the windings and fault currents internal to the housing will take a different breakdown path to ground with respect to the windings. The latter path to ground is inductively linked with one of the windings and extends between the two windings, whereas the former path to ground is external to the windings and is essentially independent of inductive linkage with said windings, whereby to cause said current transformer windings to accurately distinguish between internal and external fault currents so as to cause proper relaying of an associated differential protective system.

The invention will be better understood by considering the following description taken in connection with the accompanying drawing, and its scope will be pointed out in the appended claims.

The single figure of the drawing is a view, partly in schematic form and partly in section, showing an electrical system embodying the invention.

The electrical system shown in the drawing may be designed for either single phase or polyphase operation, but for the purposes of simplicity, portions of the system are illustrated by means of a conventional one line diagram.

A pair of electrical conductors which, for illustrative purposes, may be designed bus sections 1 and 2 are electrically interconnected through a circuit breaker 3 which may be termed the bus-tie circuit breaker. Connected to bus section 1 are electrical circuits 4 and 5, and connected to bus section 2 are electrical circuits 6 and 7. These electrical circuits may be feeder circuits for supplying electrical energy to a bus section, or may be distribution circuits for supplying electrical energy from a bus section to a load. The circuits 4, 5, 6 and 7 are respectively connected to associated bus sections 1 or 2 through circuit breakers 8, 8a, 8b and 8c. These circuit breakers are shown only schematically in the drawing since they may be of any conventional type. Since all of these circuit breakers may be substantially identical, it is considered necessary to describe only a single one. More particularly, circuit breaker 8, located at one side of the bus-tie breaker 3, includes a pair of fixed contacts 9 adapted to be bridged by a movable bridging contact 10 which is biased toward open position and is latched in the closed position shown by a latching mechanism 11. Latch 12 of the latching mechanism is biased toward latching position and is motivated to the tripped position by means of an electromagnetic device or solenoid 13 which may derive energy from a tripping source which preferably is a direct current source indicated at 14. For simplicity, the breakers 8b and 8c on the opposite side of the bus-tie breaker 3 are shown as having their trip mechanism operable from a separate tripping source 14', but it is obvious that all of the breaker trip mechanisms could be operated from a single source.

The bus-tie breaker 3 is a high voltage impulse type of breaker having terminal portions 15 and 16 respectively connected to bus sections 1 and 2. Terminal portion 16 has a relatively fixed contact 17 connected thereto. A movable contact 18 is electrically connected to opposite terminal portion 15 by means of a conductor 19 and the usual current transfer fingers 20. The separable contacts 17 and 18, which are shown latched in closed position by latching mechanism 21, are suitably biased toward open position and are adapted to separate in response to tripping of the latch 22, which is biased toward latching position. An interrupting chamber about the contacts 17 and 18 is defined by a cylindrical member 23 formed of insulating material and suitably supported from a base 24. Circuit breakers of this general type are well known in the art.

The interrupting chamber is mounted within a weatherproof insulating column or housing supported from the base 24 and comprising generally cylindrical porcelain shells 25, 25'. Interposed between these porcelain shells, or housing portions, is a bushing current transformer assembly C. T. comprising a pair of current transformers having windings 26 and 27, each of which is wound about a conventional annular or tubular core C surrounding the cylindrical member 23. These windings are generally toroidal in form and also surround the cylindrical member 23. Winding 26 is partially enclosed by a metallic shielding casing 28 and winding 27 by a similar metallic shielding casing 29. These casings 28 and 29 are interconnected through the outer peripheral portion of a metallic plate 30 which constitutes conducting structure extending radially between the two current transformers and connected between opposed flanges formed at the outer periphery 32 of casings 28 and 29, the metallic plate and casing means being grounded at the outer peripheral portion of the assembly, as indicated at 31. For reasons which will become apparent as the description proceeds, the inner peripheral portions 33 and 34 of the respective casings 28 and 29 are insulated at 35, 36 from the inner peripheral portion of the ground connected plate 30, and the only electrical connection between the casings and the plate is adjacent the outer peripheries 32 thereof. Suitable insulation 37, 38 of a well-known character insulates the windings 26 and 27 from the casings 28, 29 and from the ground connected plate 30. Mounted radially inwardly of the current transformer windings 26 and 27 and of casings 28 and 29 is a generally cylindrical conductive sleeve 39 which constitutes conductive shielding structure and extends axially along the current transformer assembly on opposite sides of the plate 30 and for a major portion of the axial length of said assembly. More specifically, the shielding sleeve 39 is encompassed by the casings 28 and 29 throughout substantially their entire extent. This conductive shielding sleeve is connected to the inner periphery of grounded plate 30, is insulated from the casing means 28, 29 at all points except for the connection through plate 30 and cooperates with the other structure of the current transformer assembly to produce the novel results hereinafter described. Suitable gaskets 40 and 41 at opposite ends of the assembly assure a weatherproof bushing structure.

Inspection of this current transformer assembly C. T., as shown in the drawing, makes it apparent that the primary circuit of the current transformer secondary windings 26 and 27 normally comprises conductor 18 and accordingly, current flow through conductor 18 normally induces a current flow in both secondary windings 26 and 27. Effective current flow through conducting sleeve 39, since this sleeve 39 is encompassed by the cores C of the current transformer assembly, would similarly induce a current flow in a secondary winding 26 or 27. Current flows through this sleeve 39 only under internal fault conditions, such as indicated, for example, at U or V, but under such conditions the sleeve 39 would, in effect, constitute a portion of the primary circuit for the current transformer assembly. To explain further, if effective current flows through fault V to ground, a current would be induced in secondary winding 27, or alternatively, if effective current flows through fault U to ground, current would be induced in winding 26. Thus, it may be stated that the paths formed by elements 18 or 39 through the current transformer assembly C. T. are inductively linked with the secondary winding structure. As for fault currents flowing to ground in the casing means 28, 29, as would take place under external fault conditions, such as illustrated at T or Y, these fault currents would have substantially no magnetic effect on the secondary windings and, hence, such fault currents are considered to flow to ground through a breakdown path which is essentially independent of inductive linkage with the secondary windings. The insulation provided at the inner peripheral portions 33 and 34 of casings 28 and 29 prevents such external fault currents from flowing to ground through a path encompassed by the secondary windings. The significance of these features of the current transformer assembly C. T. will appear more clearly as the description proceeds.

In order to protect the electrical system shown in the drawing, normally-open differential relays 50 and 51 are provided for selectively or collectively controlling the tripping of the circuit breakers included within the system. For this purpose, differential relay 50 includes contacts 52 which when closed, establish a tripping circuit, generally indicated at A, for the tripping means associated with circuit breakers 8, 8a and 3. For example, closure of contacts 52 connects the tripping means 13 and 13a of circuit breakers 8 and 8a, respectively, across the source 14 and, similarly, connects a tripping means 45 of circuit breaker 3 across source 14. In a corresponding manner, differential relay 51 includes contacts 53 which upon closure are adapted by means of a tripping circuit, generally shown at B, to connect the tripping means 13b, 13c, and 46 across source 14', in response to which breakers 8b, 8c, and 3 will be tripped open.

Energization of differential relay 50 is effected from a differential circuit including current transformer secondary windings 26, 54 and 55, which are energized in accordance with the current flowing in their respective primaries which, under normal conditions, are conductors 18, 4 and 5. The circuit including the transformer windings 26, 54, 55 is constructed in a well-known manner so that under normal conditions, that is, when there is no fault in the power circuit disposed between the transformer secondaries, no effective current will flow in the winding of differential relay 50. The relay 50 is energized in accordance with the difference between effective current flowing in the primary conductors 18, 39 of winding 26 and the sum of the currents flowing in the primaries 4 and 5 of windings 54 and 55, respectively. The operation of differential relay arrangements of this general type is well-understood in the art, and it is apparent that other well-known differential relay arrangements could equally well be used.

Energization of differential relay 51 is effected from a circuit including current transformer secondary windings 27, 56 and 57. The winding of relay 51 is connected in this circuit in the same manner as described with respect to relay 50. Similarly, it will be understood that relay 51 will be energized in accordance with the difference between the effective current flowing in the primary conductors 18, 39 of winding 27 and the sum of the currents flowing in the primaries 6 and 7 of windings 57 and 56, respectively.

It is apparent from the drawing that the current transformers of the assembly C. T. are mounted in overlapping relationship. That is, current transformer winding 26, which forms a part of the current transformer means 26, 54, 55 protecting one portion of the system, extends into, or overlaps into, the portion of the system protected by the second transformer means 27, 56, 57. This may be illustrated by the location of current transformer winding 26 in that portion of the primary power circuit which includes the terminal 16 and which extends between the current transformer windings 56, 57 and the current transformer winding 27. More particularly, current transformer winding 26 is located between terminal 16 and current transformer winding 27. Similarly, the winding 27 is located in that portion of the primary power circuit including terminal 15 and extending between windings 54, 55 and winding 26. More particularly, winding 27 is located between terminal 15 and winding 26.

The tripping circuits A and B should desirably contain means for deenergizing the tripping solenoids after said solenoids have effected opening of their associated circuit breakers. To this end, contacts 48, 48a, 48b and 48c are provided in the tripping circuits of the breakers 8, 8a, 8b and 8c, respectively. From the drawing, it will be obvious that these contacts will be opened in response to opening of an associated breaker thereby deenergizing the associated trip means. In a like manner, contacts 49a and 49b are provided in the tripping circuits for the breaker 3 and are adapted to be opened in response to tripping of breaker 3, thereby deenergizing trip means 45 or 46.

The operation of the above-described protective equipment will now be described with the following considerations in mind. Faults in the internal circuit of the circuit breaker are likely to be faults which the breaker itself cannot clear, and, therefore, all of the associated breakers must be relied upon to clear the fault so as to prevent current from being fed from either of the bus sections into the fault. Under such conditions, it is, therefore, necessary to open, in addition to the bus-tie breaker, the breakers in the bus sections on both sides of the bus-tie breaker. In contrast to the requirements of this internal fault condition, in the event of a fault external to the bus-tie breaker, such as an insulation flashover to ground outside of the breaker housing, in order to clear the fault the bus-tie breaker and only those breakers on the fault side of the bus-tie breaker need be opened—the electric circuits on the unfaulted side of the breaker should desirably remain operatively connected to their bus section.

The above requirements for collectively operating all breakers in the case of an internal fault and for selectively operating certain of said breakers in the case of an external fault necessitate that the current transformers associated with the circuit breaker be capable of distinguishing between internal and external faults. The novel construction of the current transformers of this invention effectively fulfills these requirements, as is demonstrated hereinafter.

Assume that a fault should occur at Y, i. e., an external fault or insulation flashover on the bus-section 1 side of the bus-tie breaker. Under such conditions, it would be necessary to open only the bus-tie breaker 3 and breakers 8 and 8a on the fault side of breaker 3, while leaving the breakers 8b and 8c closed. If current be assumed to be flowing into the bus-tie breaker 3 from terminal 16 to terminal 15 at the instant the fault Y begins, it is apparent that there will be a difference in the current flowing through conductor 18 and the sum of the currents in conductors 4 and 5 since at least a portion of the current flowing through conductor 18 is fed into the fault. This difference in currents will be detected by the current transformer windings 26, 54 and 55, which will effect operation of differential relay 50, which in turn effects energization of trip means 13, 13a and 45. Thus, it will be seen that the breakers 8 and 8a and the bus-tie breaker 3 will be opened, as required. It will also be apparent that relay 51 will not be affected by the fault Y, and hence, breakers 8b and 8c will remain closed as desired. This is the case because, since the fault is at Y, the current flowing through the conductor 18 will equal the sum of the currents flowing through conducting units 6 and 7. The fault current at Y flows to ground at 31 through the outer casing 29 of the current transformer assembly, and since the breakdown path through casing 29 is substantially independent of inductive linkage with the secondary winding 27, this fault current at Y has no effect on the energization of secondary winding 27.

If the fault be assumed to be located at the opposite external side of the bus-tie breaker, that is at T instead of Y, operation of relay 51 will be effected, but relay 50 will remain deenergized, and as a result only circuit breakers 8b and 8c on the fault side of the bus-tie breaker and the bus-tie breaker 3 will be tripped open. The reason that relay 51 will operate is, of course, because the primary current through conductor 18 no longer equals the sum of currents in conductors 6 and 7, and so the sum of the secondary currents through windings 27, 56 and 57 is no longer equal to zero. The reason that relay 50 remains inactive is because the fault current at T flows through the outer casing 28 of the current transformer assembly, and so there is no effect on the secondary winding 26 from this fault current at T. Thus, it is apparent that for external faults the protective equipment of this invention will selectively isolate the faulted portion of the electrical system.

With respect to internal faults, an essential characteristic of prior art differential protective arrangements is that the zone of the electrical circuit between the secondary windings of the current transformers is coextensive with the internal circuit of the circuit breakers. So long as it is practical to make this zone coextensive with the internal circuit of the circuit breaker, the prior art arrangement could distinguish between external and internal faults. However, in certain types of circuit breakers, it is not practical because of cost or space requirements to mount the current transformer windings in locations which would produce the desired coextensiveness. In such cases, if the current transformers have metallic supporting parts grounded in the manner of the conventional current transformers, the current transformers could not distinguish between faults external to the breaker and those in the internal circuit of the breaker but outside of the zone between the two current transformer windings.

This invention makes it possible to disregard the coextensive relationship previously required, and hence to mount the overlapping current transformers in a simple and inexpensive manner. By constructing the current transformers in accordance with the invention, this simple mounting may be attained without affecting the ability of the overlapping current transformers to distinguish between external and internal faults. To this end, we have provided the current transformer assembly shown generally at C. T., the structural details of which have already been described. Because of the particular structure of the breaker with which this current transformer assembly C. T. is associated, it is desirable to mount the assembly at one side of the fixed contact 17 and approximately midway between terminals 15 and 16. When so mounted, the porcelain shells 25 and 25′ encompass that portion of the internal circuit which is outside of the zone extending between the two windings of the current transformer assembly. In certain cases it is desirable or necessary to mount the assembly nearer one or the other of the terminals. Additionally, in certain other cases, it is desirable to mount the individual current transformer secondaries in axially-spaced relationship. The general design of current transformers constructed in accordance with this invention will operate equally well for each of these alternative mounting arrangements.

The characteristics of the current transformer assembly C. T. with respect to the detection of internal faults will now be described. As has been pointed out, the primary circuit of the current transformer secondary windings 26 and 27 may comprise either the conductor 18 or the conducting shielding sleeve 39, and any effective current flow in either of these conductors 18 or 39 will induce a current flow in the secondary winding through which said effective current flows. Assume now, for example, that a fault occurs at V, i. e., at a location in the internal circuit of the bus-tie breaker but outside of the zone of the circuit extending between the current transformer windings 26 and 27. Any fault to ground occurring within the circuit breaker housing will be directed to ground through conductive shielding members 39 and 30 since this is the path of least breakdown strength for such faults. This general concept may be alternatively expressed by pointing out that for substantially all possible breakdown paths from said internal circuit to ground, the grounded structure 39, which is encompassed by the windings, is interposed in the breakdown path between said internal circuit and any other adjacent grounded structure. Thus, fault current V would be forced to follow a path to ground along said conductive member 39 and between the current transformer windings 26 and 27. If it be assumed that current is flowing from terminal 15 to terminal 16 of the circuit breaker at the instant fault V occurs, it will be apparent that the current flowing in the primary conductor of the current transformer winding 27 will not be equal to the sum of the currents in the primary conductor of current transformer windings 56 and 57, since at least a portion of the current in the primary of winding 27 is diverted to ground before reaching the transformer windings 56 and 57. Accordingly, relay 51 will be energized and the bus-tie breaker 3 together with breakers 8b and 8c on one side of said bus-tie breaker will be tripped. It will also be apparent that when the fault occurs at V, the current flowing in the primary of the current transformer winding 26 will be unequal to the sum of the currents flowing in the primaries of current transformers 54 and 55, since at least a portion of the current flowing from circuits 4 and 5 is diverted to ground through member 30 before reaching the primary of current transformer 26. Accordingly, relay 50 will be energized to effect tripping of the breakers 8 and 8a on the opposite side of the bus-tie breaker 3. Thus, it will be seen that for an internal fault V, the circuit breakers on both sides of the bus-tie breaker will be opened as desired. Although, in the illustrative example, the current was assumed to be flowing from terminal 15 to terminal 16, the desired operation of the differential protective system will be obtained irrespective of the direction of current flow.

It will also be apparent that internal faults such as those located at U or X, as shown in the drawing, will effect the operation of the differential protective system in substantially the same manner as described with respect to the fault occurring at V, that is, the breakers on both sides of the bus-tie breaker 3 will be tripped upon the occurrence of such internal faults. For example, assume current flow from terminal 15 to 16 at the instant a fault occurs at U. Relay 51 will operate due to the difference of full fault-produced current from winding 27 and zero fault-produced current from windings 56 and 57. Accordingly, breakers 3, 8b, and 8c will be tripped open. Assuming still a fault at U and current flow from 15 to 16, relay 50 will operate due to the difference of full fault-produced current from windings 54 and 55 and zero fault-produced current from winding 26. The reason that no current is induced in winding 26 under such conditions is that the primary current for winding 26 flows from terminal 15 to U and then doubles back through the shielding path 39, 30 to ground, thus in substance cancelling out the effect of the primary current flow from terminal 15 to fault U. Thus, since relay 50, under the assumed conditions, operates in response to this zero current flow in winding 26, the breakers 8 and 8a are tripped open. So, in summary, it may be seen that in response to a fault at U the breakers 8, 8a, 8b, and 8c at both sides of the bus-tie breaker will be opened as desired. Similarly, for a fault at X instead of U these breakers 8, 8a, 8b and 8c at both sides of the bus-tie breaker will be opened. For example, for a fault at X if current be assumed as flowing from terminal 15 to 16, winding 26 will receive zero fault-produced current and windings 54, 55 will receive full fault-produced current, thus causing operation of relay 50. Assuming still current flow from terminal 15 to 16, relay 51 will also be operated because winding 27 receives full fault-produced current since the fault-produced current flows through the primary 18 of winding 27, however, windings 56 and 57 receive zero fault-produced current since the fault current is diverted to ground at X before reaching the magnetic circuits of windings 56 and 57. Thus, the sum of the currents through windings 27, 56 and 57 is no longer equal to zero and, accordingly, operation of relay 51 is effected. Thus, both relays 50 and 51 are operated when an internal fault occurs at X, thereby opening the breakers at both sides of the bus-tie breaker, as desired.

The above-described mode of operation illustrates that the current transformers of this invention are capable of accurately distinguishing between faults in any part of the internal circuit of the circuit breaker and those faults external to said internal circuit, whereby to selectively or collectively control the associated protective equipment depending upon the location of the fault, as is desired.

While we have shown our invention as applied to a pair of current transformers, in some installations it is necessary to use differential protection on only one of the bus sections. In such installations, a single current transformer located in the circuit of the bus-tie breaker and constructed in accordance with our invention would provide the desired protection.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What we claim as new and desire to secure by Letters Patent of the United States is:

1. A current transformer assembly adapted to be mounted about a primary conductor, a pair of juxtaposed secondary windings having inner and outer peripheral portions, conductive casing means disposed about said outer peripheral portion, conducting means extending from said inner peripheral portion between said windings and into an electrical connection with said casing means adjacent said outer peripheral portion, said assembly being grounded at said outer peripheral portion, and means insulating said casing means from said conducting means at all locations except at the outer peripheral portion of the assembly electrically between said windings for causing current in said conducting means flowing between said inner and outer peripheral portions to flow to ground only in a path between said windings, and for causing current flowing to ground in said casing means to be essentially magnetically independent of said windings.

2. A current transformer assembly comprising a primary conductor, a pair of secondary windings positioned about said primary conductor, said windings having inner and outer peripheral portions, grounded conductive casing means mounted about the outer peripheral portion of said windings, conductive shielding structure insulatingly interposed between the inner peripheral portion of said windings and said primary conductor and encompassed by said windings, conducting means connecting said shielding structure to ground and extending to ground by a path disposed electrically between said windings and providing the sole conductive path between said shielding structure and ground, and means insulating said casing means from said shielding structure which is encompassed by said windings except for an electrical connection provided by said conducting means which extends from said shielding structure to ground electrically between said windings.

3. The assembly of claim 2 in which said shielding structure is of generally tubular configuration and extends throughout a major portion of the axial length of said assembly as measured along the length of said primary conductor.

4. A current transformer assembly adapted to be mounted about a primary conductor, a pair of juxtaposed secondary windings having inner and outer peripheral portions, conductive casing means disposed about said outer peripheral portion, conducting means extending from said inner peripheral portion between said windings and into an electrical connection with said casing means adjacent said outer peripheral portion, said assembly being effectively grounded only at said outer peripheral portion, insulation separating said conducting means and said casing means at all points except at said connection electrically between said windings so that current flowing in said casing means will flow to ground only in a path essentially independent of inductive linkage with said windings and current flowing in said conducting means will flow to ground by a path inductively linked with one of said windings and located electrically between said windings.

5. In a curent transformer assembly, a primary conductor, a pair of spaced-apart generally tubular magnetic cores mounted about said primary conductor, a pair of current transformer secondary windings, each of which is interlinked with a different magnetic core, conductive casing means disposed about the exterior of said windings and connected to ground, conducting means extending between said windings and electrically interconnected to said casing means, and insulation means disposed so as to require currents in said casing means to flow to ground in a path external to the magnetic cores of said windings and so as to require currents in said conducting means to flow to ground in a path encompassed by the magnetic core of one of said windings.

6. The assembly of claim 5 being further characterized by said conducting means comprising conducting structure mounted radially inward of at least one of said cores.

7. The assembly of claim 6 in which said conducting structure extends for a major portion of the axial length of said assembly and is encompassed by said windings.

8. In a current transformer assembly, a primary conductor, a generally tubular magnetic core mounted about the conductor, a secondary winding interlinked to said core, a conductive sleeve interposed between said primary conductor and said secondary winding and insulated from said primary conductor, a grounded conductive casing mounted about the outer periphery of the secondary winding, said casing encompassing said conductive sleeve and mounted throughout substantially its entire extent radially outside of said sleeve, conducting means located solely at one electrical side of said secondary winding and forming the sole electrical connection between said sleeve and said casing, and insulating means for forcing all currents flowing in said casing to flow to ground by a path bypassing said sleeve, said insulating means forcing all currents flowing through said sleeve to flow to ground through said sole electrical connection.

References Cited in the file of this patent

UNITED STATES PATENTS

| | | |
|---|---|---|
| 767,503 | Scott | Aug. 16, 1904 |
| 2,327,774 | Dickinson | Aug. 24, 1943 |
| 2,549,426 | Clark | Apr. 17, 1951 |

FOREIGN PATENTS

| | | |
|---|---|---|
| 487,651 | Great Britain | June 23, 1938 |